P. COONROD.
Wheel Cultivator.
No. 38,884.
2 Sheets—Sheet 1.
Patented June 16, 1863.
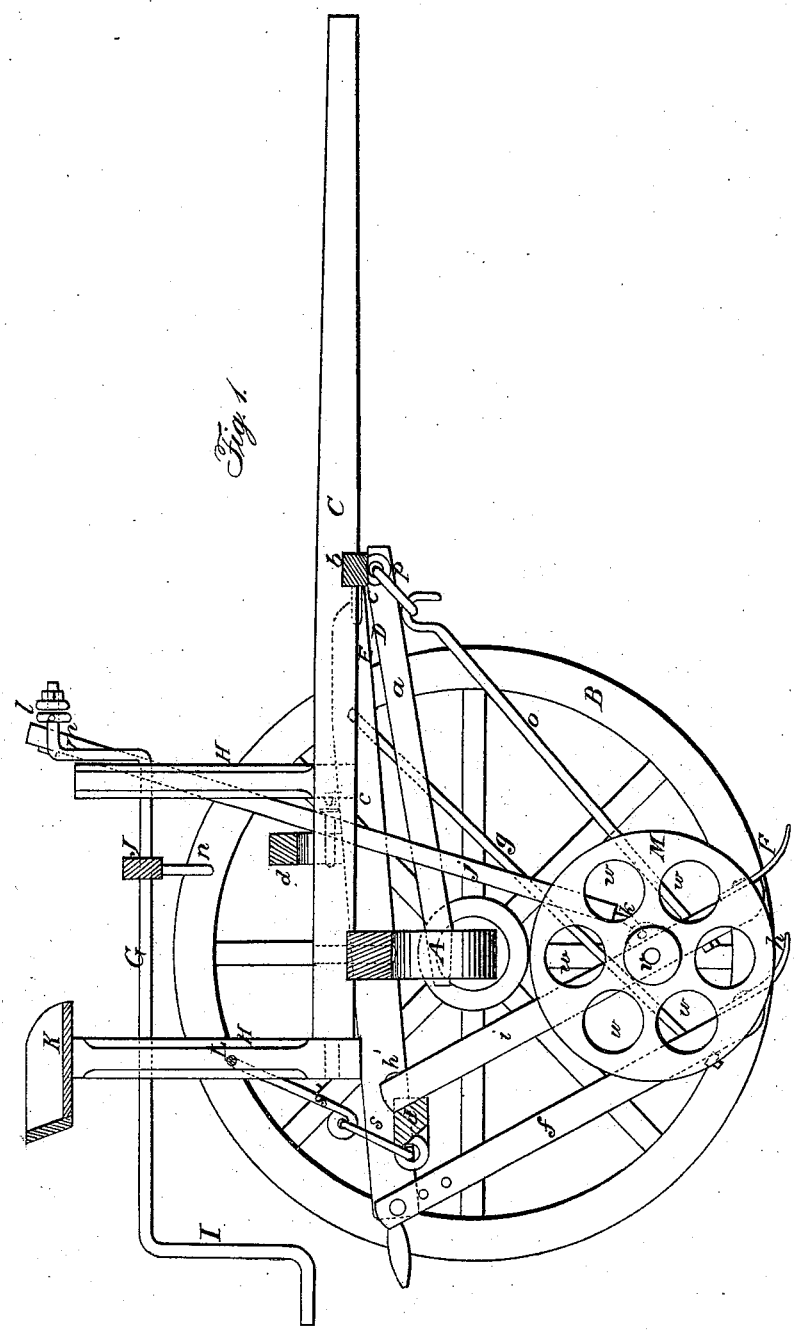
Witnesses:
J W Coombs
G. W. Reed
Inventor:
Philip Coonrod
hiv. Munn & C
Attorneys

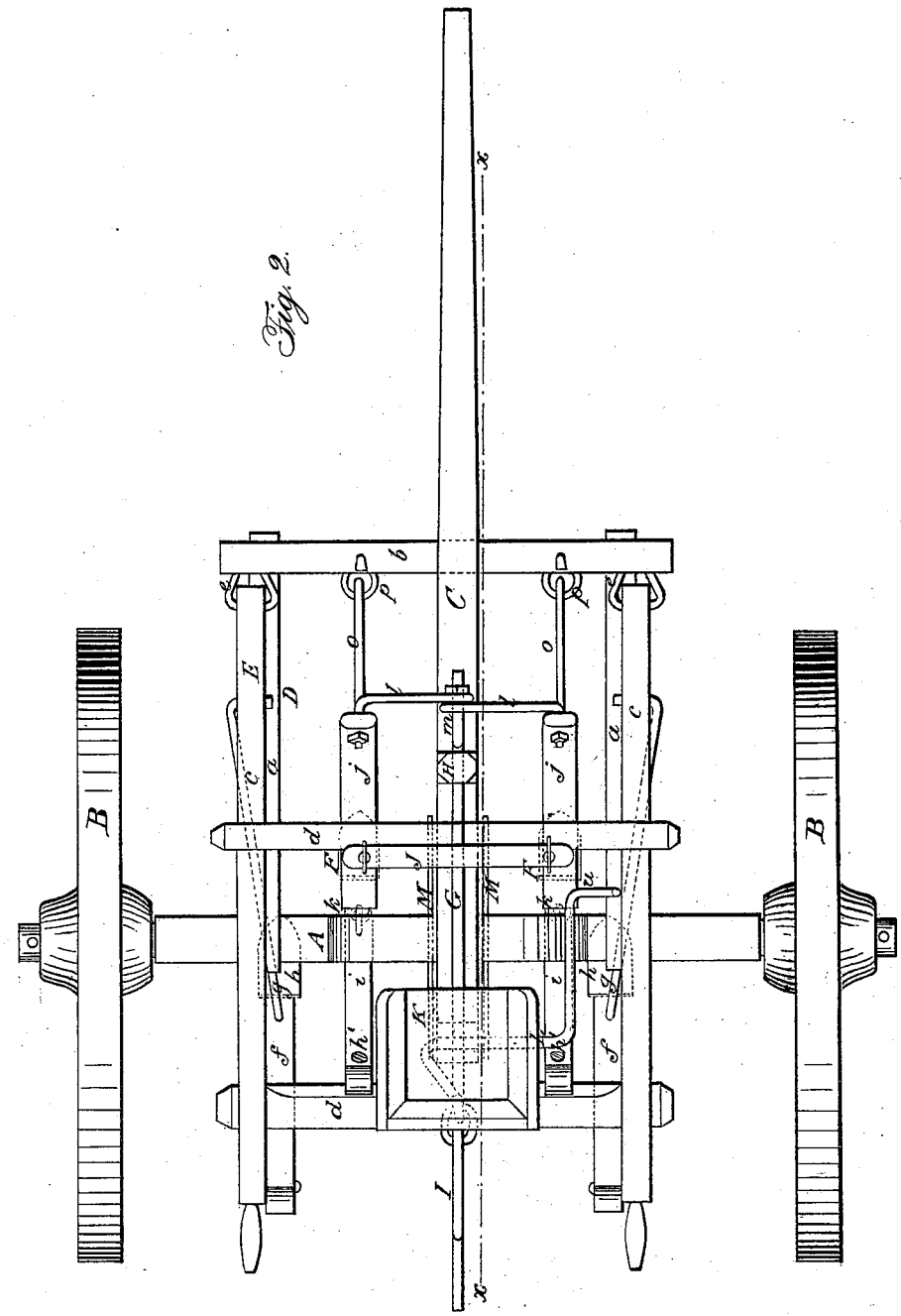

UNITED STATES PATENT OFFICE.

PHILIP COONROD, OF KEITHSBURG, ILLINOIS.

IMPROVEMENT IN CULTIVATORS.

Specification forming part of Letters Patent No. 38,884, dated June 16, 1863; antedated June 2, 1863.

*To all whom it may concern:*

Be it known that I, PHILIP COONROD, of Keithsburg, in the county of Mercer and State of Illinois, have invented a new and Improved Cultivator; and I do hereby declare that the following is a full, clear, and exact description of the same, reference being had to the accompanying drawings, making a part of this specification, in which—

Figure 1 is a side sectional view of my invention, taken in the line $x\,x$, Fig. 2. Fig. 2 is a plan or top view of the same.

Similar letters of reference indicate corresponding parts in the two figures.

This invention relates to an improved cultivator of that class designed for plowing corn and other crops which are grown in hills or drills.

The object of the invention is to obtain a simple machine for the purpose specified, and one which will, by an extremely simple arrangement of parts, admit of the plows which adjoin the rows of plants being adjusted laterally, so as to conform to the sinuosities of the latter, while the other plows with which the machine is provided work in the spaces between the rows and thoroughly pulverize the soil and eradicate the weeds therefrom, the parts being all so arranged that all the plows, and also rotary guards for protecting the plants from clods of earth thrown up by the plows, may by a simple manipulation be raised above the surface of the ground, and the adjustable plows operated by the attendant while either riding on the machine or while walking behind it.

To enable those skilled in the art to fully understand and construct my invention, I will proceed to describe it.

A represents an axle, which may be of cast-iron, with a wheel, B, placed loosely on each end of it.

C represents a draft-pole, the back end of which is attached centrally to the axle A.

D is a frame composed of two parallel bars, $a\,a$, attached to the axle and projecting from it at right angles. The front ends of these bars $a\,a$ are connected by a cross-bar, $b$, which is attached to the draft-pole. The frame D is a permanent one, it being rigidly attached to the draft-pole and axle.

E is a frame composed of two parallel bars, $c\,c$, connected by cross-bars $d\,d$. The front ends of the bars $c\,c$ are connected by hinges or joints $e\,e$ to the cross-bar $b$ of the bars $a\,a$ of the frame D. The bars $c\,c$ extend some distance back of the axle A, and have inclined standards $f$ attached to them, braced by rods $g$.

To the lower end of each standard $f$ a plow, $h$, is attached.

To the back cross-bar, $d$, of the frame $e$ there are attached by pivots $h'$ two inclined standards, $i\,i$, having plows $f$ at their lower ends. The standards $i\,i$ are allowed to swing or work freely on the pivots $h'$, and to the lower part of each standard $i$ an inclined bar, $j$, is connected by a hinge or joint, $k$. The upper ends of the bars $j$ are connected by rods $l\,l$ to a crank, $m$, at the front end of a shaft, G, the bearings of which are in uprights H H attached to the draft-pole C. The shaft G has a crank, I, on its back end, and it also has a lever, J, secured on it, with a stirrup, $n$, at each end to receive the feet of the driver when on the seat K, the latter being on the top of the back upright, H. The inclined standards $i\,i$ are braced by rods $o\,o$, the front ends of which are connected by joints $p\,p$ with the cross-bar $b$ of the frame D. The bars $j\,j$ perform the function of levers, the fulcrum-pins $g$ of which pass through oblong slots in the levers and into the front cross-bar, $d$.

The back end of the frame E is connected by link $s$ with a crank, $s'$, which is at one end of a shaft, L. This shaft L has its bearing in the back upright, H, and at the opposite end of said shaft there is a treadle or lever, $u$, which is within reach of the foot of the driver when the latter is on the seat K.

To the lower part of each standard $i$ there is attached a horizontal shaft, $v$. These shafts extend inward or toward each other, and each has a circular plate, M, placed loosely on it. These plates M are perforated with circular holes $w$, as shown in Fig. 1.

The operation is as follows: As the machine is drawn along the plows F F operate one at each side of a row of plants, and said plows are shifted or moved laterally to conform to the sinuosities of the rows by operating the lever J, which is done by the driver with his feet from the seat K. If the driver be walking behind the machine, the same result is attained by actuating the crank I. When it is necessary to elevate the plows above the surface of the ground—as, for instance, in transporting the machine from place to place, or in turning the same at the ends of rows—the driver, if on his seat, accomplishes the result by depressing the treadle or lever $u$ with his foot, and if walking behind the machine by raising the back part of the frame E direct with his hands.

The circular plates M M serve as guards and protect the plants from clods of earth thrown up by the plows F F. These plates or guards work one at each side of the row of plants and between the plows F F.

Having thus described my invention, what I claim as new, and desire to secure by Letters Patent, is—

1. The combination of the stationary frame D and the rising and falling frame E, when the latter is provided with the laterally-adjustable plows F, and guards M, arranged with the bars or levers $jj$, operated through the medium of the foot-lever J or hand-lever I, as herein set forth.

2. The lever $u$, connected with the frame E through the medium of the shaft L, crank $s'$, and link $s$; but this I only claim when used in connection with the laterally-adjustable plows F and the means employed for operating, as herein described.

PHILIP COONROD.

Witnesses:
 MARK J. O'BRIEN,
 PHILIP WEAVER.